Figure 1:
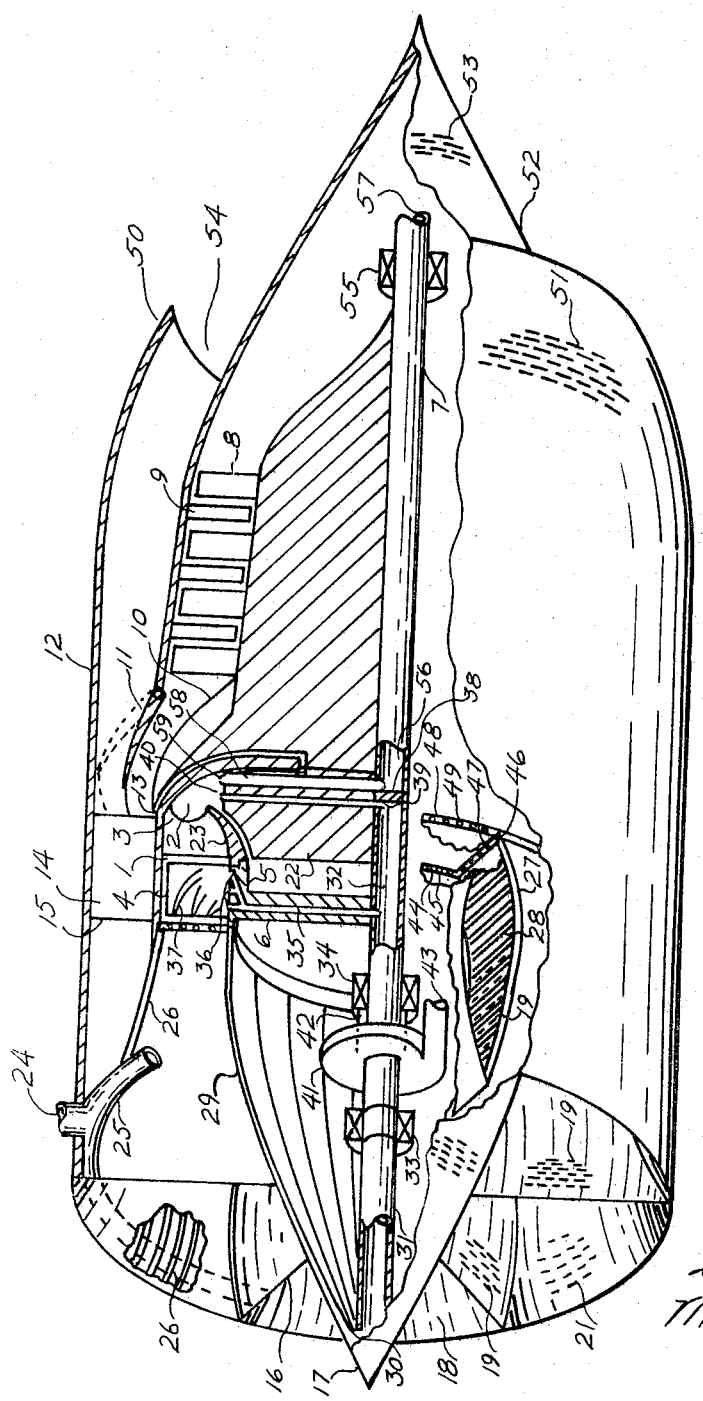

March 14, 1967 D. E. NELSON ETAL 3,308,626
CONVERTIBLE GAS TURBINE-ROCKET REACTION PROPULSION ENGINE
Filed June 9, 1964 2 Sheets-Sheet 1

Daniel E. Nelson
and
Marjorie W. Nelson
INVENTORS

BY Daniel E. Nelson

March 14, 1967  D. E. NELSON ETAL  3,308,626
CONVERTIBLE GAS TURBINE-ROCKET REACTION PROPULSION ENGINE
Filed June 9, 1964
2 Sheets-Sheet 2
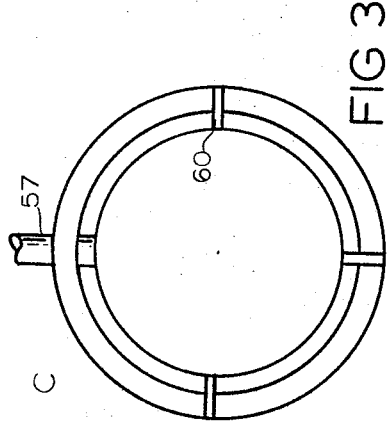
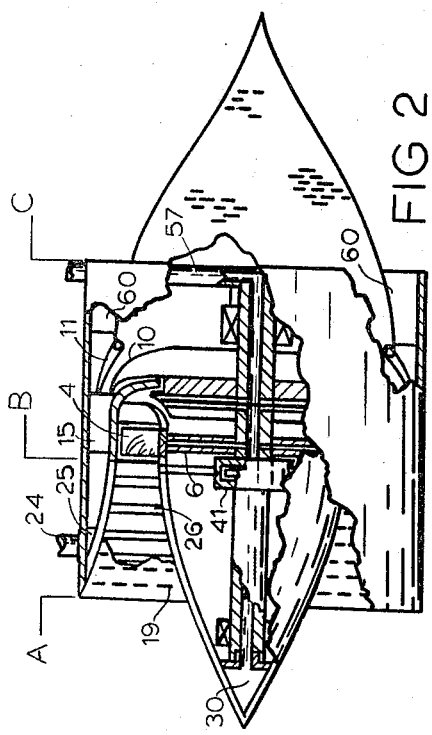
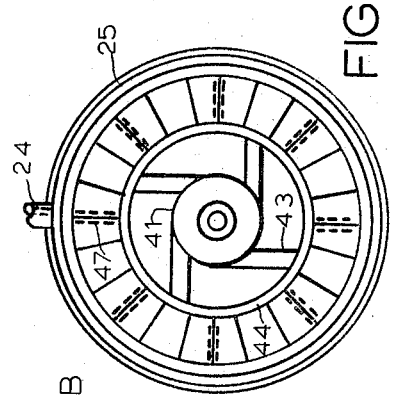
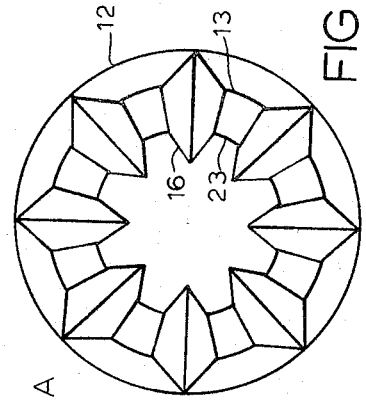
INVENTORS
BY Daniel E. Nelson
Marjorie W. Nelson United States Patent Office 3,308,626
Patented Mar. 14, 1967

3,308,626
CONVERTIBLE GAS TURBINE-ROCKET
REACTION PROPULSION ENGINE
Daniel E. Nelson and Marjorie Webster Nelson, both of
Rancho Cordova, Calif. (both of 212 Appleton Drive,
Aptos, Calif. 95003)
Filed June 9, 1964, Ser. No. 373,765
6 Claims. (Cl. 60—244)

This invention relates to new and useful improvements in rocketjet engines and in particular to an engine which can be used as a rocket or jet engine or both with high efficiency at low and high speeds and altitudes with long life.

For airbreathing jet application, intake air is caused to bypass an annular combustion chamber, to be partially discharged for bypass, to enter a hollow nose cone through airfoil channels and then to be compressed into the front of an annular combustion chamber through an annular thrust chamber inlet simultaneously with fuel. Fuel is caused to pass through regenerative cooling tubes in a thrust chamber-nozzle assembly and then to be partially injected into the front of the thrust chamber and partially into the rear of the thrust chamber from off the rear of the turbine blades after having been used to vapor cool the blades. Fuel is also deposited on the thrust chamber walls for vapor cooling.

For rocket engine applications, oxidizer from an onboard source is injected into the front of the annular thrust chamber inlet simultaneously with the forward fuel injection.

One object of this invention is to provide a jet engine with turbine blade cooling and thrust chamber cooling of sufficient capacity to allow for a high ratio of fuel to air with high heat of explosion and low air overrun.

Another object of this invention is to provide a jet engine with air bypass for thrust chamber cooling in addition to high mass flow and low wake loss.

Another object of this invention is to provide a jet engine with high ram pressurization uninhibited by turbine blades at high speeds.

Another object of this invention is to provide both a ram jet intake and a turbojet intake with low frontal drag, reduced parasitic air drag and reduced friction heat.

Another object of this invention is to provide a jet engine with intake air heat exchange to increase precombustion air temperature and to decrease exhaust temperatures for high thermal efficiency.

Another object of this invention is to provide use of oxidizer for partial or total rocket engine uses.

The novel features that are characteristic of the invention are set forth with particularity in the appended claims. The invention itself, however, both as to its organization and method of operation, together with additional objects and advantages thereof, is explained in the following specification.

This invention is illustrated in the accompanying drawings wherein FIG. 1 is a cut-away isometric drawing; FIG. 2 is a cut-away side view; FIG. 3 is a forward view to station C; FIG. 4 is a rearward view to station A; and FIG. 5 is a forward view at station B.

These improvements in rocketjet engines comprise annular thrust chamber 1, annular thrust chamber inlet 2, combustion flow straightener 3, turbine blades 4, turbine wheel 5, turbine wheel spokes 6, shaft 7, rotor blades 8, stator blades 9, forward impeller 10, swinging intake air guide 11, engine housing 12, outer thrust chamber wall 13, annular intake air passage 14, airflow straightener-heat exchanger fin 15, airfoil nozzle-intake air channel 16, hollow plug nozzle 17, thrust chamber skirt 18, airfoil nozzle bypass air outlets 19, plug nozzle bypass air outlets 20, thrust chamber skirt bypass air outlets 21, rear impeller 22, inner thrust chamber wall 23, fuel intake line 24, fuel distributer line 25, thrust chamber regenerative cooling fuel tubes 26, skirt-to-airfoil-channel fuel distributer line 27, airfoil channel regenerative cooling fuel tubes 28, plug nozzle regenerative cooling tubes 29, plug nozzle fuel collector 30, fuel collector tube 31, rear tubular shaft section 32, collector tube-shaft rotatable connection 33, rear tubular shaft bearing 34, turbine spoke fuel line 35, turbine wheel fuel outlets 36, turbine blade fuel guide channels 37, rear impeller fuel tube 39, fuel-oxidizer separating wall 38, fuel injection nozzle 40, cooling fuel pump 41, pump mounts 42, vapor cooling fuel distributer tube 43, plug nozzle vapor cooling fuel tube 44, plug nozzle vapor cooling fuel outlet 45, airfoil nozzle vapor cooling fuel tube 46, airfoil nozzle vapor cooling fuel outlet 47, thrust chamber skirt vapor cooling fuel tube 48, thrust chamber skirt vapor cooling fuel outlet 49, outer nose cone 50, outer nose cone intake ports 51, inner nose cone 52, inner nose cone intake ports 53, ram intake port 54, forward tubular shaft bearing 55, forward tubular shaft section 56, rotatably connected oxidizer supply tube 57, rear impeller oxidizer supply tube 58, oxidizer injector nozzle 59 and inner nose cone structural connector 60.

The operation of these improvements in rocketjet engines is accomplished in the following manner. Combustion of fuel and air or other oxidizer is caused to occur in annular thrust chamber 1 after being pumped through annular thrust chamber inlet 2. Combustion products are directed rearwardly by combustion flow straightener 3 and against turbine blades 4 which cause turbine wheel 5 to rotate.

Turbine wheel spokes 6 are connected to shaft 7. Rotor blades 8 are caused to rotate by being connected to shaft 7 and to pump air rearwardly in combination with stator blades 9 to forward impeller 10 which is also connected to shaft 7. When a vehicle to which this engine is attached is not moving sufficiently rapidly, the air being pumped by rotors 8, stators 9 and impeller 10 is directed against swinging intake air guide 11 in an outward position such that the air is directed rearwardly between engine housing 12 and outer thrust chamber wall 13 through annular intake air passage 14. When vehicle speed is sufficient that ram pressures are greater than rotary pumping pressures, intake air from both the rotary and ram pumping pressurization will flow rearwardly through annular intake air passage 14 with swinging intake air guide in an inward position.

Combustion heat is transferred to the intake air stream and the intake air stream in annular air passage 16 is caused to flow more directly rearward by air-flow-straightener-heat-exchanger fin 15.

Intake air is directed from annular intake air passage 14 through airfoil nozzle-intake air channels 16 to hollow plug nozzle 17 from thrust chamber skirt 18.

A portion of the intake air is ejected into the combustion stream for increased mass cooling and reduced wake loss through airfoil nozzle bypass air outlets 19, plug nozzle bypass air outlets 20, and thrust chamber skirt bypass air outlets 21.

Air not ejected for bypass and cooling purposes is pumped forward in hollow plug nozzle 17 by rear impeller 22 past turbine wheel spokes 6, along the surface of inner thrust chamber wall 23 and into annular thrust chamber inlet 2. Intake air caused to enter the annular thrust chamber inlet 2 will be at a high temperature from heat absorbed from the walls of the heat exchanger fins 15, the thrust chamber skirt 18, the airfoil nozzle 16 and the plug nozzle 17 as well as from the outer thrust chamber wall 13 and the inner thrust chamber wall 23.

Fuel is taken into the engine through fuel intake line 24 and distributed through fuel distributer line 25 to regenerative cooling fuel tubes 26 in the thrust chamber skirt 18 from which it is directed through skirt-to-airfoil-nozzle distributer lines 27, to airfoil nozzle regenerative cooling fuel tubes 28, to plug nozzle regenerative cooling tubes 29 and then to plug nozzle fuel collector tube-shaft rotatable connection 33. Rear tubular shaft bearing 34 is cooled by fuel passing through the tubular shaft. Fuel is conveyed through turbine wheel spoke fuel line 35 to turbine fuel outlets 36 at the base of turbine blades 4.

Centrifugal force from the turbine wheel rotation causes the fuel deposited at the base of the blades to travel outwardly in a direction perpendicular to the engine axis. The pressure of the combustion stream causes the fuel to flow rearwardly at the same time such that the direction of flow follows an arc outwardly and rearwardly on the turbine blades. Turbine blade fuel guide channels 37 on the faces of the turbine blades direct the flow of the fuel on the blades in approximately the same flow pattern caused by the combination of forces from centrifugal force and from combustion. Part of the fuel vaporizes in traversing the turbine blades and causes a cooling effect thereby on the blades. The remainder of the fuel on the blades is directed to a narrow constricting portion of the channels at the rear of the blades and injected under pressure into the combustion stream in an atomized and heated condition.

Approximately one-fourth to one-third of the fuel in the rear tubular shaft section 32 will be conveyed to the forward portion of the rear tubular shaft section 32 aft of fuel-oxidizer separating wall 38 and through rear impeller fuel tube 39 to fuel injector nozzle 40, where it will be injected into annular thrust chamber inlet 2.

Vapor cooling fuel is directed from the rear tubular shaft section 32 and pumped by cooling fuel pump 41 mounted to rear tubular shaft bearing 34 by pump mounts 42. Part of the fuel pumped by pump 41 is directed through vapor cooling fuel distributer tube 43 to plug nozzle vapor cooling fuel tube 44 and deposited on the surfaces of plug nozzle 17 through plug nozzle vapor cooling fuel outlets 45. Another portion of the fuel from pump 41 is directed through airfoil nozzle vapor cooling fuel tube 46 and deposited on the surfaces of airfoil nozzles 16 through airfoil nozzle vapor cooling fuel outlets 47. The remaining portion of the fuel from pump 41 is directed through thrust chamber skirt vapor cooling fuel tubes 48 and deposited on the surfaces of thrust chamber skirt 18 through thrust chamber skirt vapor cooling fuel outlets 49.

Intake air is drawn into outer nose cone 50 through outer nose cone intake ports 51 and into inner nose cone 52 through inner nose cone intake ports 53. Intake ports 51 and 53 are preferably shaped rectangularly and positioned with the long edges perpendicular to the engine axis to draw in surface air uniformly. The intake ports are preferably located over the entire surface of outer nose cone 50 and inner nose cone 52 which lies ahead of the thickest portion of these nose cones in order to reduce drag and take in air from the widest area possible. The inner nose cone can be extended in length and the intake ports 53 therein increased in size to allow for sufficient air intake for the rotors 8, stators 9, and impeller 10.

An annular ram intake port 54 is provided between outer nose cone 50 and inner nose cone 52.

Forward shaft bearing 55 is caused to support forward tubular shaft section 56 and to serve in conjunction with a rotatable connection to oxidizer supply tube 57. For partial or full rocket operation, oxidizer is directed from forward tubular shaft section 56 through rear impeller oxidizer supply tube 58 and injected by centrifugal force from oxidizer injector nozzle 59.

This invention operates as a jet engine when only air is allowed to enter as the oxidizer. It operates as a partial jet when both air and oxidizer are caused to enter the annular thrust chamber inlet. It is a full rocket when no air is available owing to ambient conditions. It is a turbine jet with high thermal efficiency and high mass flow at low vehicle speeds and is a ram jet with heat-exchanger-induced thermal efficiency at high speeds in the atmosphere.

Fuel and air or other oxidizer are well atomized and mixed under high pressure and temperature for high combustion completeness and low combustion delay. Combustion temperature for the various applications of the engine is relatively low ahead of the turbine blades because of the high ratio of air or oxidizer to fuel injected at the annular thrust chamber inlet. Combustion aft of the turbine blades is rapid and complete because of the high heat and high degree of atomization of the fuel injected from the turbine blades and because of the constricted flow of the combustion stream ahead of widest portion of the airfoil nozzle channels.

Cooling in the combustion chamber aft of the turbine blades is accomplished by a combination of air cooling, vapor cooling and regenerative cooling tubes when the engine is in the atmosphere. When used out of the atmosphere, the increased rate of fuel consumption with the on-board oxygen supply will give a greater cooling effect to compensate for the absence of air cooling. The amount of vapor cooling fuel deposited on the thrust chamber surfaces can be increased for additional cooling effect as required.

As will be apparent to one skilled is the art, various changes and numerous modifications of the disclosed structure may be made without departing from the spirit of the invention, and all of such changes are contemplated as may come within the scope of the appended claims.

What is claimed is:

1. A reaction propulsion engine operable in either a gas turbine mode or a rocket mode comprising a compressor, a compressor air intake, a separate ram air intake, an engine exhaust duct, an outer member surrounding said exhaust duct and forming therewith an annular passage between said member and said exhaust duct, means progressively, selectively, connecting said compressor or said ram air intake to said annular passage, a hollow member within said exhaust duct, hollow vanes connecting said annular passage with said hollow member, a combustion chamber, second compressor means for drawing air from said annular passage through said vanes and hollow member and supplying said air to said combustion chamber, a self-contained oxidizer supply, means for selectively placing said self-contained oxidizer supply in communication with said combustion chamber, a fuel supply, heat exchanger conduits in the walls of said exhaust duct communication with said fuel supply and said combustion chamber, and a turbine driven by combustion gases from said combustion chamber and driving said compressors.

2. In a reaction propulsion engine substantially as described in claim 1, a nozzle-cooling and by-pass air augmentation means comprising outlets from the annular passage, from the hollow member within the exhaust duct and from the hollow vanes connecting the annular passage with the hollow member, said outlets being made to face downstream with respect to the flow of combustion gases.

3. In a reaction propulsion engine substantially as described in claim 1, a means for selectively placing self-contained oxidizer and fuel in communication with the combustion chamber and comprising a compressor shaft with a forward shaft conduit extended with the shaft from the front end thereof to the vicinity of the second compressor means, a rearward shaft conduit extended within the shaft from the rear end thereof to the vicinity of the second compressor means, a conduit rotatably connected to the front end of the shaft, a separate conduit rotatably connected to the rear end of the shaft, a member separating the conduit extended from the rear of the shaft and the conduit extended from the front of the shaft, injector nozzles positioned in proximity to the tips of the blades of the second compressor means, conduits extended from the forward shaft conduit to nozzles on the compressor means, conduits extended from the rearward shaft conduit to nozzles on the compressor means, outlets at the turbine, and conduits connecting the outlets at the turbine with the rearward shaft conduit.

4. In a reaction propulsion engine substantially as described in claim 1, a combustion chamber throat comprising forwardly and rearwardly tapering vanes connecting the annular passage with the hollow member with the exhaust duct.

5. In a reaction propulsion engine substantially as described in claim 1, an air intake means comprising a nose cone with intake orifices therein.

6. In a reaction propulsion engine substantially as described in claim 1, a variable air seal comprising members pivotably attached to members between the compressor air intake and the ram air intake.

References Cited by the Examiner
UNITED STATES PATENTS

| | | |
|---|---|---|
| 2,600,235 | 6/1952 | Galliot _____ 60—39.51 |
| 2,625,794 | 1/1953 | Williams _____ 60—39.36 X |
| 2,745,249 | 5/1956 | Sanborn _____ 60—35.6 |
| 2,955,414 | 10/1960 | Hausmann _____ 60—35.6 X |
| 2,956,402 | 10/1960 | Rae _____ 60—39.02 |

MARK NEWMAN, *Primary Examiner.*

RALPH D. BLAKESLEE, *Examiner.*